(12) United States Patent
Nemoto (10) Patent No.: US 6,223,251 B1
(45) Date of Patent: Apr. 24, 2001

(54) DISK PROCESSING APPARATUS AND A RECORDING MEDIUM FOR RECORDING A DISK CONTROL PROGRAM

(75) Inventor: Kazuo Nemoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/047,238

(22) Filed: Mar. 25, 1998

(30) Foreign Application Priority Data

May 2, 1997 (JP) .................................................. 9-114555

(51) Int. Cl.[7] .................................................. G06F 12/06
(52) U.S. Cl. .................................................. 711/114
(58) Field of Search .................... 360/47; 369/32, 369/47, 83, 84; 711/114

(56) References Cited

U.S. PATENT DOCUMENTS

| | | | |
|---|---|---|---|
| 5,893,138 | * 4/1999 | Judd et al. | 711/114 |
| 5,900,101 | * 5/1999 | Aoki et al. | 711/114 |
| 5,915,094 | * 6/1999 | Kouloheris et al. | 345/327 |
| 5,974,544 | * 10/1999 | Jeffries et al. | 713/1 |

OTHER PUBLICATIONS

"The performance of Parity Placements in Disk Arrays," Lee and Katz, IEEE Transactions on computers, vol. 42, No. 6, Jun. 1993, pp. 651–664.*

"Methods for Improved Update Performance of Disk Arrays," Menon and Kasson, IBM Research Division, Almaden Research Center, San Jose, CA, Res., Rep., RJ 6928 (66034), 1989.*

* cited by examiner

*Primary Examiner*—Matthew Kim
*Assistant Examiner*—C. P. Chace
(74) *Attorney, Agent, or Firm*—Esther E. Klein; Abdy Raissinia (57) ABSTRACT

Each of HDDs 6 and 7 is partitioned into two drives, comprising an outer zone and an inner zone. Each outer zone having a faster read/write access rate is called the "faster portion", whereas each inner zone having a slower read/write access rate is called the "slower portion". In accordance with a control program in RAM 3, CPU 1 is caused to execute "mirroring" such that the faster portion of one of HDDs 6, 7 is paired with the slower portion of the other one of HDDs 6, 7. In so configuring, it is possible to execute "mirroring" such that a difference between the access rates of the faster zone of one of the disks and the slower zone of the other one of the disks is always kept large. Thus, whenever one of the disks having a faster access rate becomes ready earlier, it is possible to immediately start the next read/write to this disk without waiting for completion of the write to the other disk having a slower access rate, thereby to improve access efficiency.

16 Claims, 6 Drawing Sheets

DISK PROCESSING APPARATUS AND A RECORDING MEDIUM FOR RECORDING A DISK CONTROL PROGRAM

FIELD OF THE INVENTION

This invention relates to a disk processing apparatus and a recording medium for controlling a disk storage device to be used as data storage means for a computer.

BACKGROUND OF THE INVENTION

Typical data storage means for a computer is a magnetic disk drive, and an architecture for improving availability of such a magnetic disk drive is known as RAID (Redundant Array of Inexpensive (or Independent) Disks).

RAID-1 is equated with "mirroring" and is alternatively called "duplexing" in a case where separate disk controllers (SCSI: Small Computer system Interface; IDE: Intelligent Drive Electronics) are used. Its operations, with respect to physically separate two disks having the same capacity, are carried out as follows:

read: reading from either one of the disks; and
write: writing into both disks.

RAID-5, 6 is a technique which is adapted for striping data and distributing such data called "striped data set" across a plurality of hard disks, thereby to improve availability in the presence of disk failure, if any. Its operations, with respect to physically separate n disks having the same capacity, are carried out as follows:

write: writing data into (n-1) disks,
and
writing parity into a single disk (RAID-5)
or
writing parity into two disks (RAID-6); and
read: reading data other than parity. Or, in case of a disk failure, reading data and parity together.

Problems to be Solved by the Invention

However, in said RAID-1, 5 and 6, there are problems as set forth below.

A length of data writing areas of the outermost track on a hard disk is about two times as large as that of the innermost track, and in order to make the recording density constant, a technique called "Zone Bit Recording (ZBR)" has been used for reducing the number of recording sectors with movement toward the inner tracks. Therefore, the read/write access rate at the outer tracks is faster than that of the inner tracks. However, in the conventional RAID-1, every read/write to two disks has been carried out without taking into account any difference of access rate among their zones at all. That is, as detailed hereafter, the characteristic of the ZBR has not been contemplated for improving access rate of each disk.

Similarly, with respect to RAID-5, 6, there are the same problems as set forth above.

It is, therefore, an object of this invention to provide a disk processing apparatus and a recording medium which are capable of solving the aforesaid problems and improving access rate.

SUMMARY OF THE INVENTION

To accomplish said object, in one aspect of the invention, there is provided a disk processing apparatus having at least two disks, each having outer tracks and inner tracks that include fewer sectors than said outer tracks. This disk processing apparatus comprises a write controller for writing identical data into a first disk and a second disk of said at least two disks such that said identical data is written into at least a portion of the outer tracks of said first disk and into at least a portion of the inner tracks of said second disk respectively, said second disk being different from said first disk.

In another aspect of the invention, there is provided a recording medium for recording a control program executable by a computer to write data into at least two disks of a disk processing apparatus such that said computer is caused to write identical data into at least a portion of outer tracks of a first disk and at least a portion of inner tracks of a second disk of said at least two disks respectively.

Preferably, said recording medium is be a ROM.

Further, said recording medium may be provided in an I/O processor for a disk device connected to a system bus of a computer system.

Further, in another aspect of the invention, there is provided a disk processing apparatus having at least three disks, each having outer tracks and inner tracks that include fewer sectors than said outer tracks. This disk processing apparatus comprises a data write controller for writing a striped data set across at least respective portions of outer tracks of a first disk and a second disk of said at least three disks, and a parity write controller for writing the parity that is associated with said data set written into said first and second disks into at least a portion of the inner tracks of a third disk of said at least three disks, said third disk being different from said first and second disks.

Further, in another aspect of the invention, there is provided a recording medium for recording a control program executable by a computer to write data into at least three disks of a disk processing apparatus such that said computer is caused to write a striped data set across at least respective portions of outer tracks of a first disk and a second disk of said at least three disks, and to write the parity associated with said data set written into said first and second disks into at least a portion of the inner tracks of a third disk of said at least three disks, said third disk being different from said first and second disks.

Preferably, said recording medium is a ROM.

Further, said recording medium may be provided in an I/O processor for a disk device connected to a system bus of a computer system.

DESCRIPTION OF THE PREFERRED EMBODIMENT OF THE INVENTION

Figure 1:
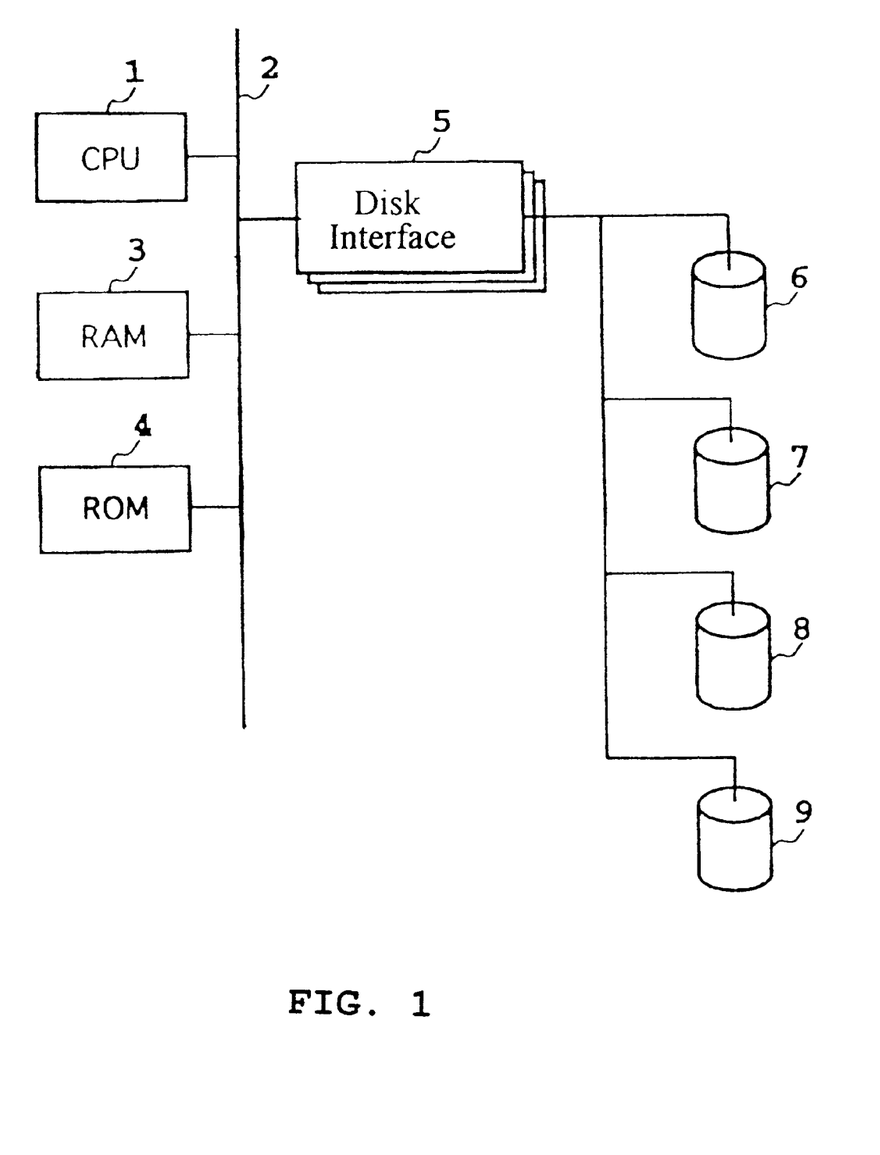
FIG. 1 is a block diagram of a computer system relating to an implementation of this invention.

FIG. 1 is a block diagram showing major components of a computer system incorporating an implementation of this invention. CPU 1 controls overall operations of each component connected together via a system bus 2. RAM 3 is a main memory for storing work items of CPU 1, an OS, application programs including a control program to be described below or the like. ROM 4 stores a system initialization program executable by CPU 1. SCSI interface 5 processes communications between the system bus 2 and four hard disk drives (HDDs) 6 to 9. Software programs, including the OS and the control program to be described below, may be stored in a single HDD and then loaded into RAM 3 at the time of system initialization. While other components such as a keyboard, a video RAM, a display device, a floppy disk drive or the like may be connected to the system bus 2 via associated controllers or the like respectively, they are not shown in FIG. 1 nor are they explained further herein since they are well known in the art.

In accordance with the control program stored in RAM 3, CPU 1 executes operations for each HDD to read/write data, and whenever required, it generates the parity based on the data and executes operations for each HDD to read/write the generated parity. As explained in detail below with respect to each embodiment, this invention has been made on the basis of and by making use of the fact that the read/write access rate at an outer track on a hard disk is different from that of an inner track, thereby to execute efficient operations.

Figure 2:
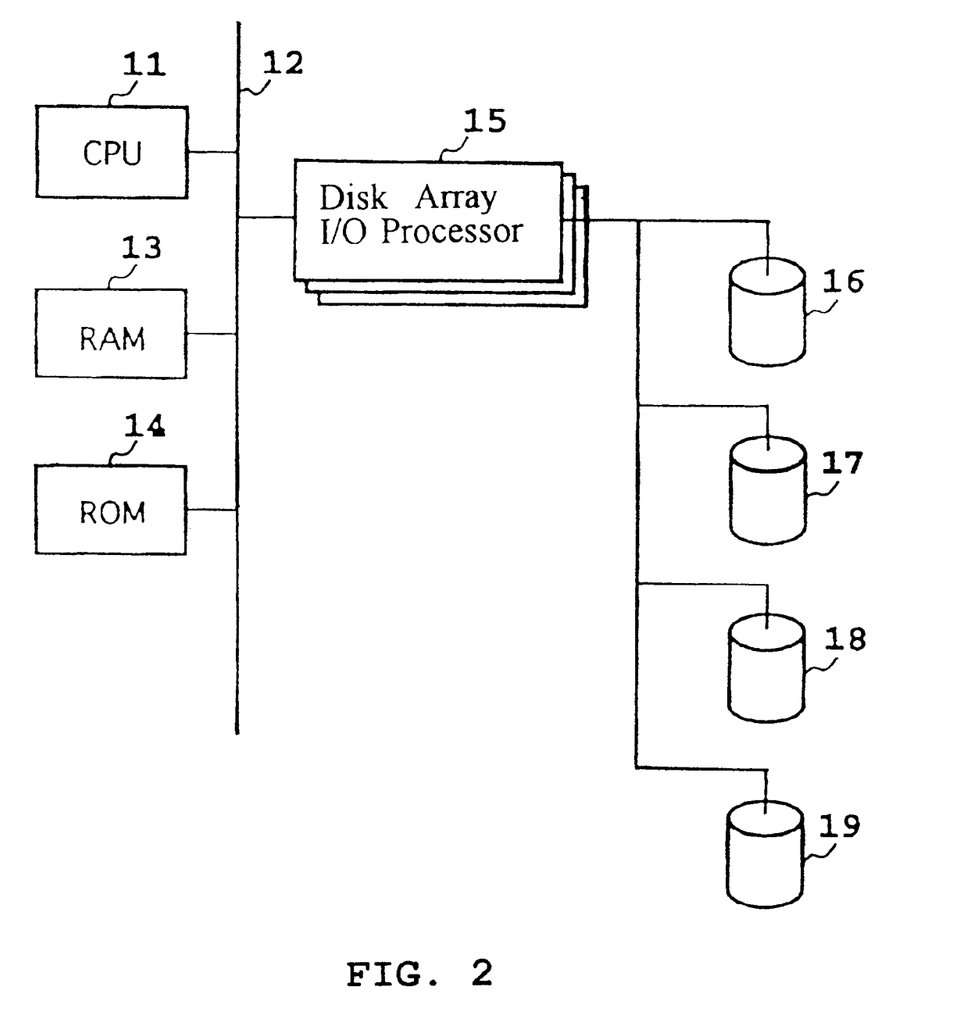
FIG. 2 is a block diagram of a computer system relating to another implementation of this invention.

FIG. 2 is a block diagram showing major components of a computer system incorporating another implementation of this invention. CPU 11 controls overall operations of each component connected together via a system bus 12. RAM 13 is a main memory for storing work items of CPU 11, an OS, application programs or the like. ROM 14 stores a system initialization program executable by CPU 11. Disk array I/O processor 15 processes communications between the system bus 12 and four hard disk drives (HDDs) 16 to 19, and controls operations for each HDD. The OS and the application programs may be stored in a single HDD and then loaded into RAM 13 at the time of system initialization.

Figure 3:
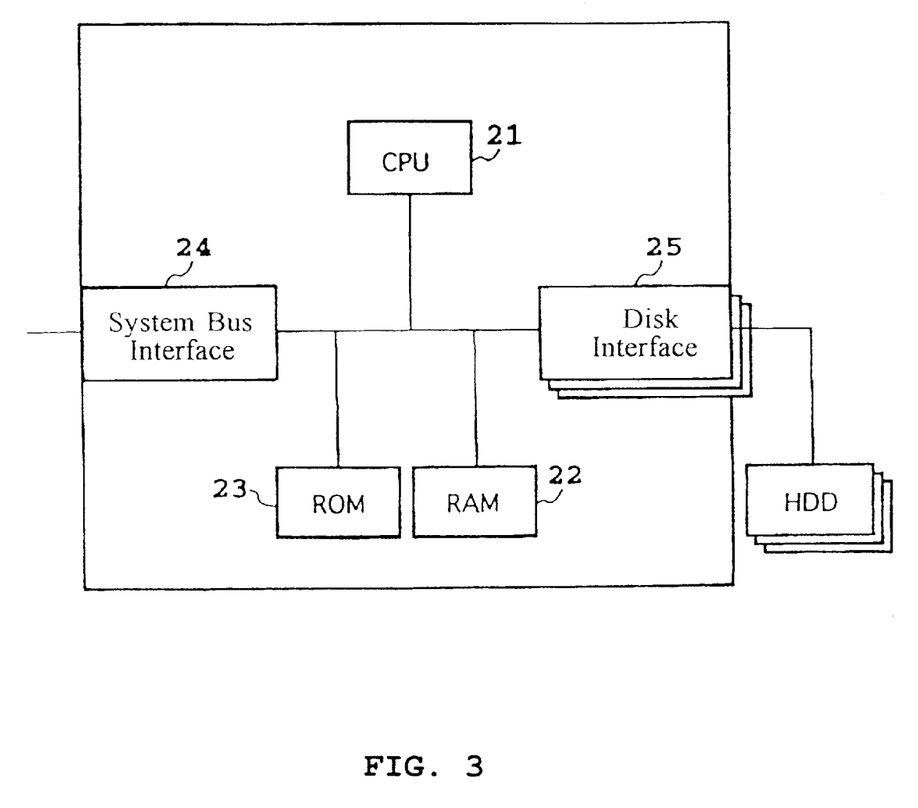
FIG. 3 is a block diagram of a disk array I/O processor.

FIG. 3 is a block diagram showing the disk array I/O processor 15. CPU 21 controls overall operations of the disk array I/O processor 15. RAM 22 stores work items of CPU 21, a control program to be described below or the like. ROM 23 stores an initialization program which is executable by CPU 21 to initialize the disk array I/O processor 15. The control program may be stored in a single HDD and then loaded into RAM 22 at the time of initialization of the disk array I/O processor 15.

In accordance with the control program stored in RAM 22, CPU 21 executes operations for each HDD to read/write data, and whenever required, it generates the parity based on the data and executes operations for each HDD to read/write the generated parity. As explained in detail below with respect to each embodiment, this invention has been made on the basis of and by making use of the fact that the read/write access rate at an outer track on a hard disk is different from that of an inner track, thereby to execute efficient operations. System bus interface 24 transfers data and commands between the system bus 12 and the disk array I/O processor 15. SCSI interface 25 transfers the data and the commands between the disk array I/O processor 15 and each HDD.

Assume here that the configuration of FIG. 1 is used, and that each of HDDs 6 and 7 is partitioned into two drives which comprise an outer zone and an inner zone. Each outer zone having a faster read/write access rate is called the "faster portion", whereas each inner zone having a slower read/write access rate is called the "slower portion". With this arrangement, in accordance with the control program in RAM 3, CPU 1 is caused to execute "mirroring" with respect to HDD 6 (DISK-1) and HDD 7 (DISK-2) such that the faster portion of DISK-1 and the slower portion of DISK-2 are paired together, whereas the slower portion of DISK-1 and the faster portion of DISK-2 are paired together. In so configuring the first embodiment, an improved advantage as set forth below can be gained. That is, looking at "write" accesses alone, whenever a write to either one of the two disks is complete, this drive can be immediately regarded as being ready for the next read/write from the system's standpoint. Therefore, by combining the faster zone of one of the two disks with the slower zone of the other disk, and by executing "mirroring" such that a difference between the respective access rates thereof is always kept large, it follows that one of the two disks having a faster access rate becomes ready earlier in time and, thus, it is possible to immediately start the next read/write to this disk without waiting for completion of the write to the other disk having a slower access rate, thereby improving access efficiency.

Next, to show the advantage of the first embodiment, calculated results of theoretical access efficiencies for the first embodiment and a conventional example are comparatively explained below.

COMPUTATION EQUATION 1

Throughput of Random Combinations of Conventional Mirroring without Consideration of Zones (it is assumed here that hard disks of four zones be used, and these zones' throughput be 8, 4, 2, 1 (Kbyte/mSEC) respectively in order of their positions from the fastest outermost portion)

| DISK-1 ZONE | DISK-2 ZONE | | PROBABILITY | THROUGH-PUT |
|---|---|---|---|---|
| 8 | : 8 or 4 or 2 or 1 = | | 8/4 + 8/4 + 8/4 + 8/4 = | 8 |
| 4 | : 8 or 4 or 2 or 1 = | | 8/4 + 4/4 + 4/4 + 4/4 = | 5 |
| 2 | : 8 or 4 or 2 or 1 = | | 8/4 + 4/4 + 2/4 + 2/4 = | 4 |
| 1 | : 8 or 4 or 2 or 1 = | | 8/4 + 4/4 + 2/4 + 1/4 = | 3.75 |
| | | | AVERAGE = | 5.19 |

COMPUTATION EQUATION 2

Throughput in Accordance with the Mirroring (Combinations of Faster Zones and Slower Zones) of This Invention

| DISK-1 ZONE | DISK-2 ZONE | | PROBABILITY | THROUGHPUT |
|---|---|---|---|---|
| 8 | : 2 or 1 | = | 8/2 + 8/2 = | 8 |
| 4 | : 2 or 1 | = | 4/2 + 4/2 = | 4 |
| 2 | : 8 or 4 | = | 8/2 + 4/2 = | 6 |
| 1 | : 8 or 4 | = | 8/2 + 4/2 = | 6 |
| | | | AVERAGE = | 6 |

Comparing the above throughput, it results in 6/5.19= 1.156, indicating that the access rate of the first embodiment is faster than the conventional example by 15.6% in theory.

Next, to show the advantage of the first embodiment, experiment results for a conventional example, a reference example and the first embodiment are comparatively explained below.

a. Test Conditions

| | |
|---|---|
| OS Used | : OS/2 Warp connect + LAN Server Advanced Ver. 4.0 |
| Benchmark Software Used | : IOSTONE |
| Setting Used | : MEMORY CACHE was set to OFF as much as possible |
| Contents of STARTUP.CMD | : CACHE/LAZY : OFF<br>CACHE/BUFFERIDLE : 1<br>CACHE/MAXAGE : 1<br>CACHE/DISKIDLE : 1 |
| HARD DISKS Used | : 160 MB SCSI P/N: 79F3994<br>MLC: C81025<br>FRU: 56F8851<br>MODEL: WDS-3160<br>Two units of the above hard disks were used in parallel, and the OS was stored in another disk. |
| MACHINE used | : IBM PC720<br>32 Bit SCSI CARD with CACHE<br>24 Mbyte main memory |
| DISK Conditions Used: | : MIRRORING was done with 150 MB partitioned into 75 MB halves | b. MIRRORING Conditions

Figure 4A:
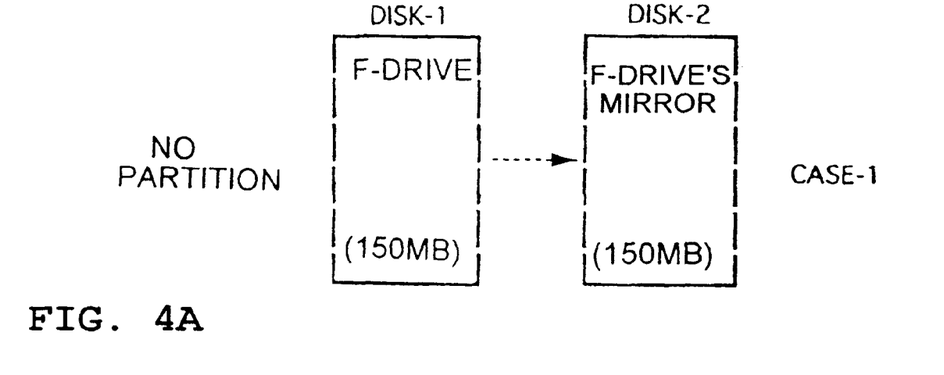
FIG. 4 is an explanatory diagram illustrating various forms of mirroring.

As shown in FIG. 4 at A, said two hard disks (DISK-1, 2) were used without any partition for executing "mirroring" of overall disks.

Figure 4B:
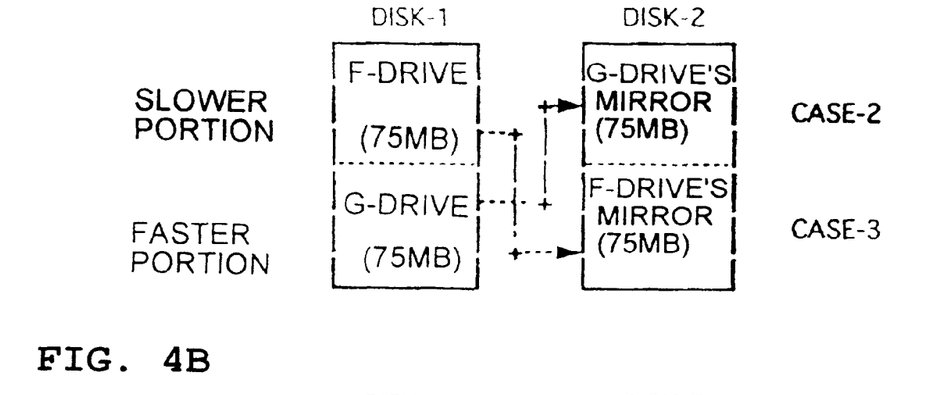

As shown in FIG. 4 at B, each of said two hard disks (DISK-1, 2) was partitioned into an inner 75 MB (slower portion) and an outer 75 MB (faster portion) respectively. In this example the outer 75 MB of DISK-1 was combined with the inner 75 MB of DISK-2 (CASE-2) and the inner 75 MB of DISK-1 was combined with the outer 75 MB of DISK-2 (CASE-3) for executing "mirroring".

Figure 4C:
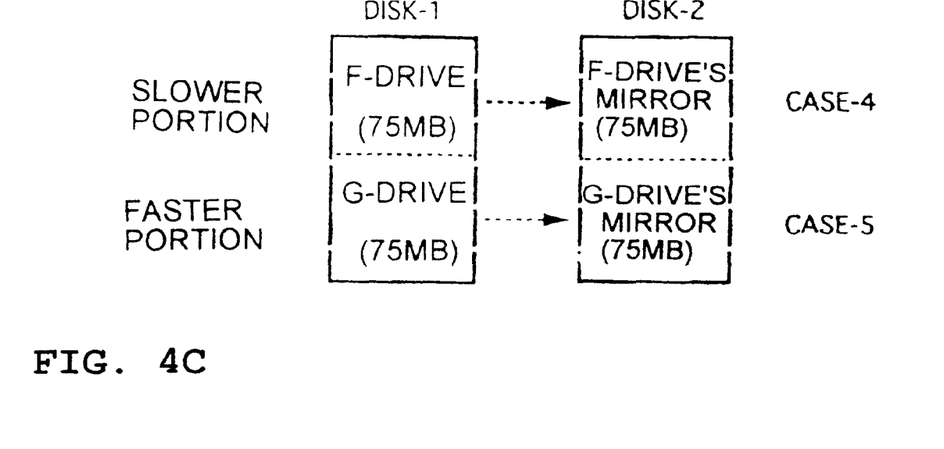

AS shown in FIG. 4 at C, each of said two hard disks (DISK-1, 2) was partitioned into an inner 75 MB (slower portion) and an outer 75 MB (faster portion) respectively. In this example the inner 75 MB of DISK-1 was combined with the inner 75 MB of DISK-2 (CASE-4) and the outer 75 MB of DISK-1 was combined with the outer 75 MB of DISK-2 (CASE-5) for executing "mirroring".

c. Test Results

| Test Case | No. of Attempts | Value of IOSTONE | Transfer Rate (KB/SEC) | Required Time (SEC) |
|---|---|---|---|---|
| CASE-1 | 1 | 800 | 9 | 2500 |
| | 2 | 800 | 9 | 2502 |
| | 3 | 800 | 9 | 2500 |
| | 4 | 802 | 9 | 2496 |
| | 5 | 800 | 9 | 2500 |
| | | AVERAGE800.4 | | |
| CASE-2 | 1 | 809 | 9 | 2473 |
| | 2 | 810 | 9 | 2470 |
| | 3 | 810 | 9 | 2470 |
| | 4 | 812 | 9 | 2464 |
| | 5 | 812 | 9 | 2465 |
| | | AVERAGE810.6 | | |
| CASE-3 | 1 | 810 | 9 | 2472 |
| | 2 | 811 | 9 | 2467 |
| | | AVERAGE810.5 | | |
| CASE-4 | 1 | 801 | 9 | 2497 |
| | 2 | 800 | 9 | 2502 |
| | 3 | 798 | 9 | 2508 |
| | 4 | 801 | 9 | 2497 |
| | | AVERAGE800.0 | | |
| CASE-5 | 1 | 809 | 9 | 2474 |
| | 2 | 810 | 9 | 2471 |
| | 3 | 809 | 9 | 2475 |
| | | AVERAGE809.3 | | |

(NOTE: As a value of IOSTONE becomes larger, access rate is improved.)

d. Conclusions

In comparison with the conventional example of CASE-1, the first embodiment of CASE-2, 3 was faster in the same hardware conditions by 1.02% as figured out: ((810.6+810.5)/2)800.4=1.012.

With respect to "mirroring" in RAID-1, presumptions that faster+faster=faster
faster+slower=faster
slower+faster=faster
slower+slower=slower were ascertained. In case of successive writes, it was unable to gain access rate improvement as taught by a theoretical equation due to slower zones, but it was ascertained that such an improvement would be gained by using appropriate settings. While the first embodiment solely depends on partitions' setting, it may be possible to gain access rate improvement thereof by making use of dedicated driver which is designed to monitor idle conditions of disks so that an idle disk can be accessed.

Figure 5:
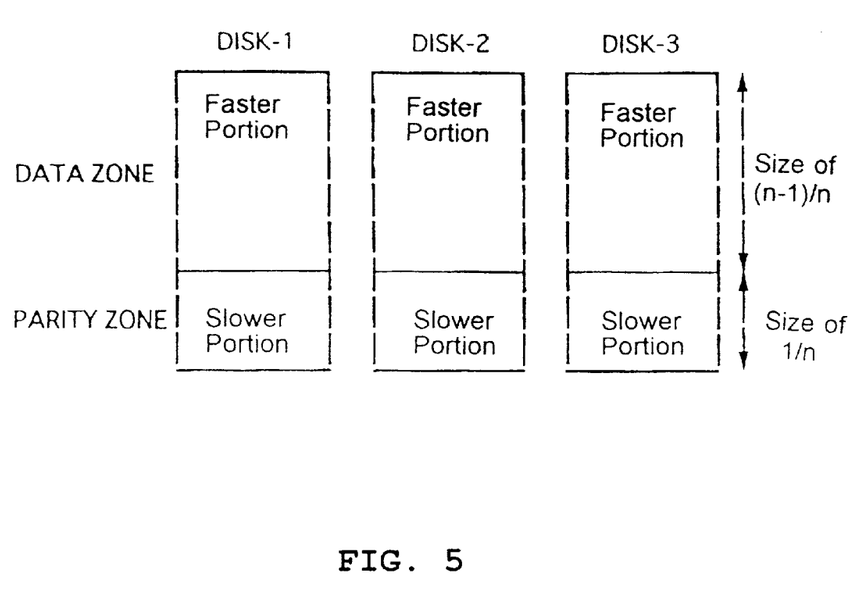
FIG. 5 is an explanatory diagram illustrating zone configurations of hard disks.

Assume here that the configurations of FIGS. 2 and 3 are used, and that, as shown in FIG. 5, each of HDDs 16, 17 and 18 (disk-1, 2, 3) is partitioned into two drives which comprise an outer zone (having a size of (n−1)/n in the radial direction) and an inner zone (having a size of 1/n in the radial direction). Each outer zone having a faster read/write access rate is used as a "DATA ZONE" where a read/write of data is carried out, and each inner zone having a slower read/write access rate is used as a "PARITY ZONE" where a read/write of its parity is carried out. With this arrangement, in accordance with the control program in RAM 23 (pursuant to RAID-5, for example), CPU 21 is caused to perform striping of data and write the striped data set across DATA ZONES of disk-1, 2, 3, and to write the parity across PARITY ZONES of disk-1, 2, 3 respectively. In so configuring the second embodiment, an improved advantage as set forth below can be gained. That is, noticing "read" access alone, there is no need to read the parity (except for a case where the system is in a disk failure condition). Therefore, by storing such parity which has no need to be read out into the inner portions of disks each having the slowest read access rate in an concentrative manner, it is possible to increase read access rate of the data.

Next, to show the advantage of the second embodiment, calculated results of theoretical access efficiencies for the second embodiment and a conventional example are comparatively explained below.

Assume that RAID-5 comprising three disks is used.

Assume further that throughput of each disk is such that 80 (Kbyte/mSEC) at the outermost portion, 53 (Kbyte/mSEC) at the position of ⅔ radius away from the outermost portion, and 40 (Kbyte/mSEC) at the innermost portion.

Figure 6A:
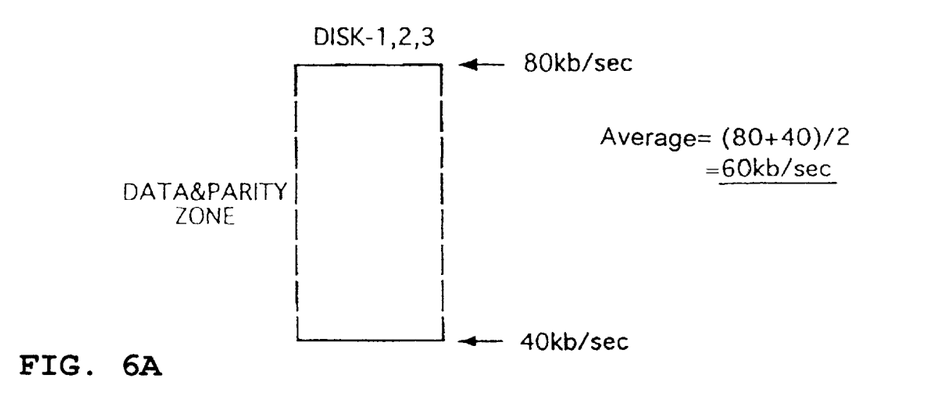
FIG. 6 is an explanatory diagram illustrating read access rates of hard disks.

As shown in FIG. 6 at A, each of DISK-1, 2, 3 is used without any partition and data alone is subject to striping for writing across DISK-1, 2, 3. In so writing data, the average read access rate of this arrangement is: (80+40)/2=60 (Kbyte/mSEC).

Figure 6B:
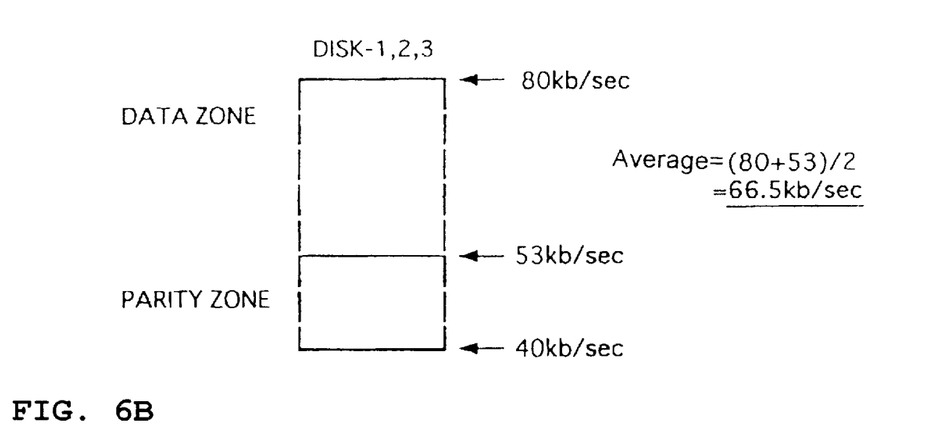

As shown in FIG. 6 at B, each of DISK-1, 2, 3 is partitioned at the position of ⅔ radius away from the outermost portion respectively, and data alone is subject to striping for writing across outer portions (DATA ZONES) respectively. In so writing data, the average read access rate of the second embodiment is: (80+53)/2=66.5 (Kbyte/mSEC).

Therefore, in accordance with the second embodiment, access rate improvement of about 10% can be gained in comparison with the prior art.

Operations of two HDDs, as described in regard to the first embodiment, may be executed with the configurations of FIGS. 2 and 3 as well. That is, each of HDDs 16 and 17 may be partitioned into two drives, comprising an outer zone having a faster read/write access rate and an inner zone having a slower read/write access rate. Further, the control program to be loaded into RAM 3 may be alternatively loaded into RAM 22 within the disk array I/O processor 15 from HDD 19, for example, and in accordance with the control program in RAM 22, CPU 21 may be caused to execute "mirroring" with respect to HDD 16 (DISK-1) and HDD 17 (DISK-2), such that the faster portion of DISK-1 and the slower portion of DISK-2 are paired together, whereas the slower portion of DISK-1 and the faster portion of DISK-2 are paired together.

Moreover, operations of three HDDs, as described in regard to the second embodiment, may be executed with the configuration of FIG. 1 as well. That is, each of HDDs 6, 7 and 8 (disk-1, 2, 3) may be partitioned into two drives, comprising an outer zone (having a size of (n−1)/n in the radial direction) and an inner zone (having a size of 1/n in the radial direction), such that each outer zone having a faster read/write access rate may be used as a "DATA ZONE" where a read/write of data is carried out, and each inner zone having a slower read/write access rate may be used as a "PARITY ZONE" where a read/write of the parity is carried out. Further, the control program to be loaded into RAM 22 may be alternatively loaded into RAM 3 from HDD 9, for example, and in accordance with the control program in RAM 3 (in pursuant to RAID-5, for example), CPU 1 may be caused to perform striping of data and write the striped data set across DATA ZONES of disk-1, 2, 3, and to write the parity across PARITY ZONES of disk-1, 2, 3 respectively.

While this invention has been described with reference to a magnetic disk apparatus, it will be understood by those skilled in the art that this inventions is not limited thereto but this invention may be well applied to other disk apparatuses such as an optical disk apparatus, magneto-optical apparatus or the like.

As described above, in accordance with this invention, access rates in disk processing can be improved.

What is claimed is:

1. A storage device comprising:
  at least two disks, each having outer tracks and inner tracks; and
  a write controller for writing identical data into a first disk and a second disk of said at least two disks such that said identical data is written on at least a portion of the outer tracks of said first disk and on at least a portion of the inner tracks of said second disk respectively.

2. A storage device comprising:
  a controller, said controller managing the execution of a write operation whereby identical data is written on at least a portion of outer tracks of a first disk and on at least a portion of inner tracks of a second disk respectively.

3. A storage device comprising;
  at least three disks, each having outer tracks and inner tracks that include fewer sectors than said outer tracks;
  a data write controller for writing a striped data set across at least respective portions of outer tracks of a first disk and a second disk of said at least three disks; and
  a parity write controller for writing the parity that is associated with said data set written into said first and second disks on at least a portion of the inner tracks of a third disk of said at least three disks.

4. A storage device comprising;
  a controller, said controller managing the execution of a write operation whereby a striped data set is written across at least respective portions of outer tracks of a first disk and a second disk, and the parity associated with said data set written on said first and second disks is written on at least a portion of the inner tracks of a third disk.

5. In a system having a storage system for storing data, the storage system comprising:
  a plurality of storage devices, each storage device comprising a storage media on which the data is stored, the storage media having a faster access portion and a slower access portion; and
  a controller writing identical data to the faster access portion of a first storage device and the slower access portion of a second storage device.

6. A storage system of claim 5 further comprising:
  a read controller for controlling a reading of a requested data stored identically on the first storage device and the second storage devices from the first storage device when the first storage device is available prior to the second storage device and from the second storage device when the second storage device is available prior to the first storage device.

7. The storage device of claim 1, wherein the inner tracks include fewer sectors than the outer tracks.

8. The storage device of claim 2, wherein said controller includes a control program.

9. The storage device of claim 2, wherein the inner tracks include fewer sectors than the outer tracks.

10. The storage device of claim 3, wherein the inner tracks include fewer sectors than the outer tracks.

11. The storage device of claim 4, wherein said controller includes a control program.

12. The storage device of claim 4, wherein the inner tracks include fewer sectors than the outer tracks.

13. In a system having a storage device, a method of storing data in said storage device comprising the steps of;
  writing a data on outer tracks of a first disk; and
  writing said data on inner tracks of a second disk.

14. The method of claim 13, wherein a write controller controls the writing of said data into said first and second disks.

15. The method of claim 13, wherein said inner track include fewer sectors than said outer tracks.

16. The method of claim 13 further comprising the steps of:
  reading the data from the first disk when the first disk is available prior to the second disk; and
  reading the from the second disk when the second disk is available prior to the first disk.

* * * * *